United States Patent Office 3,411,132
Patented Nov. 12, 1968

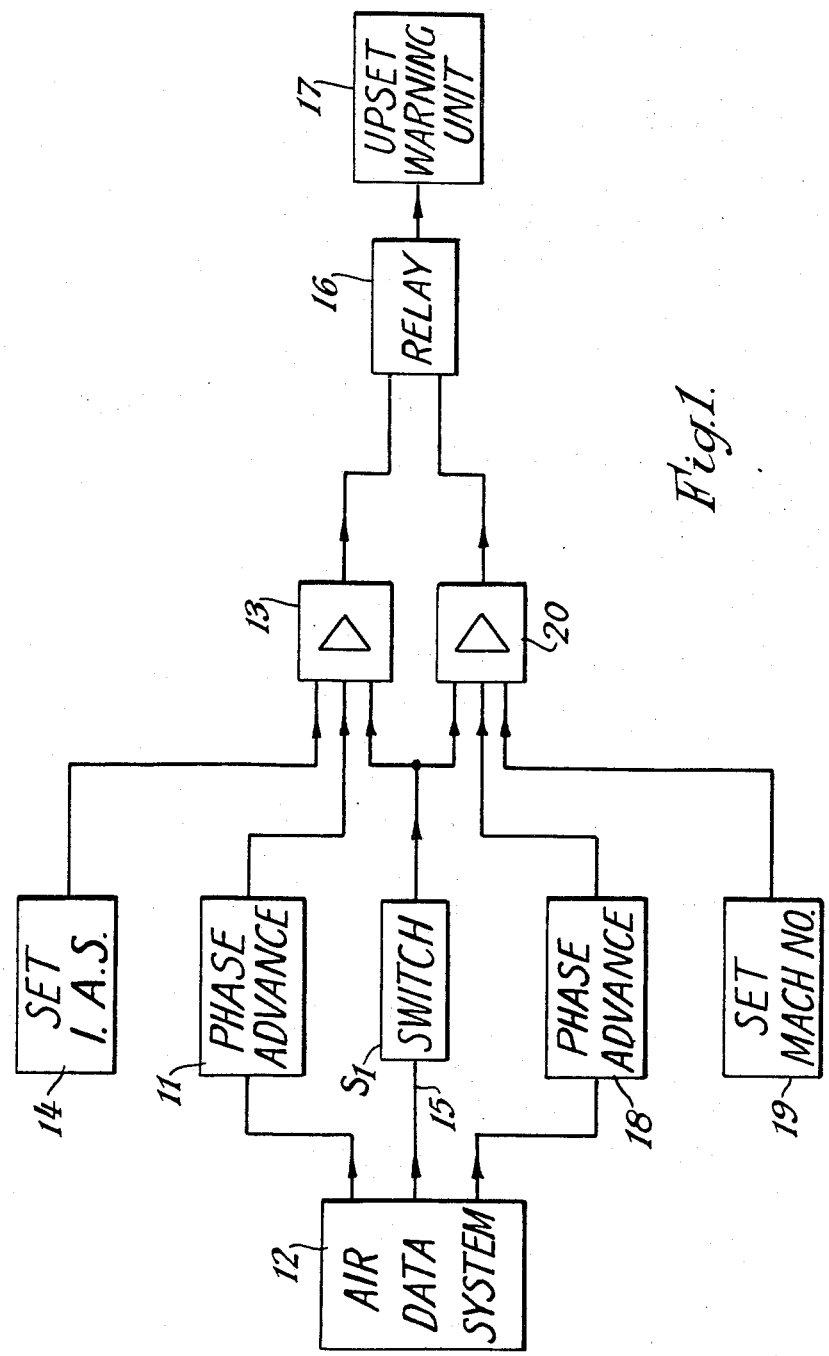

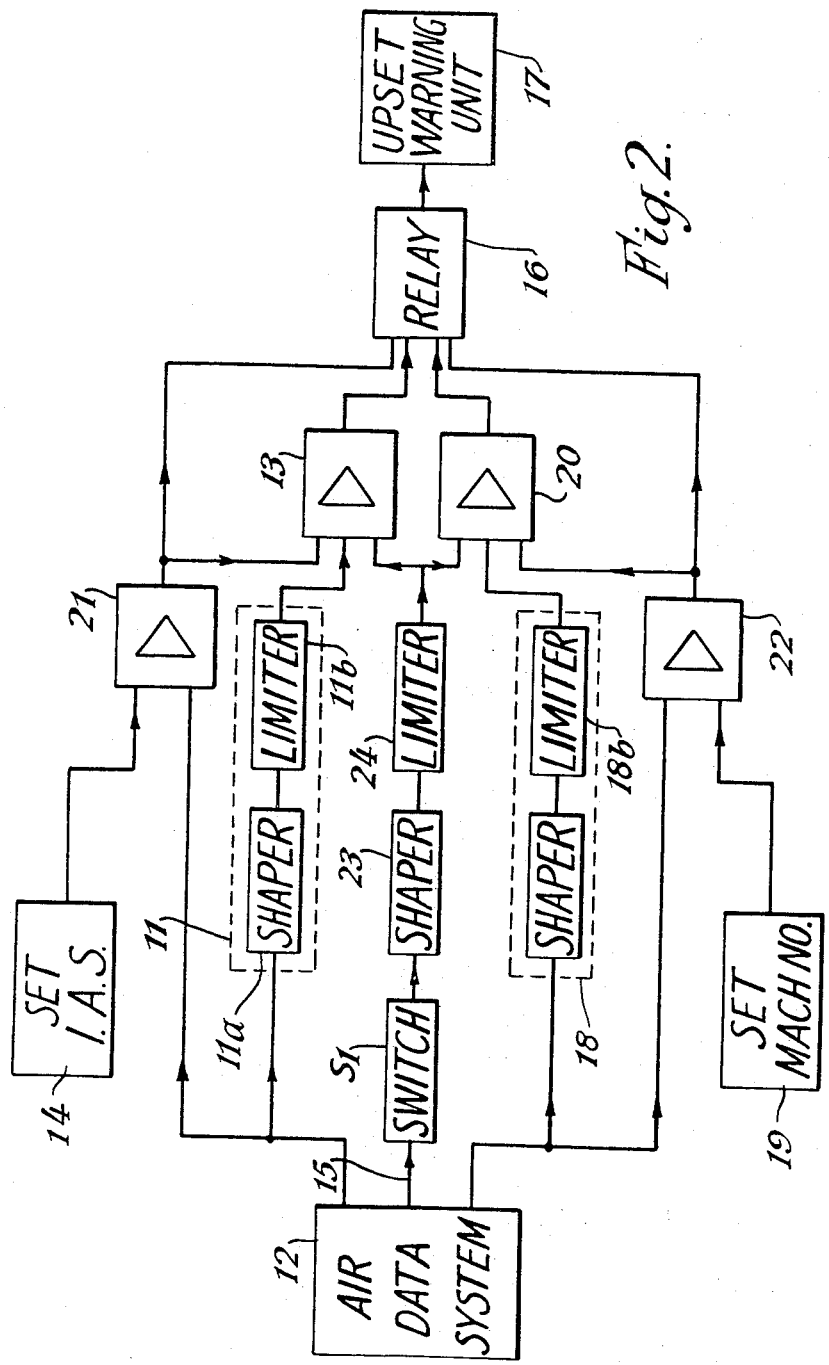

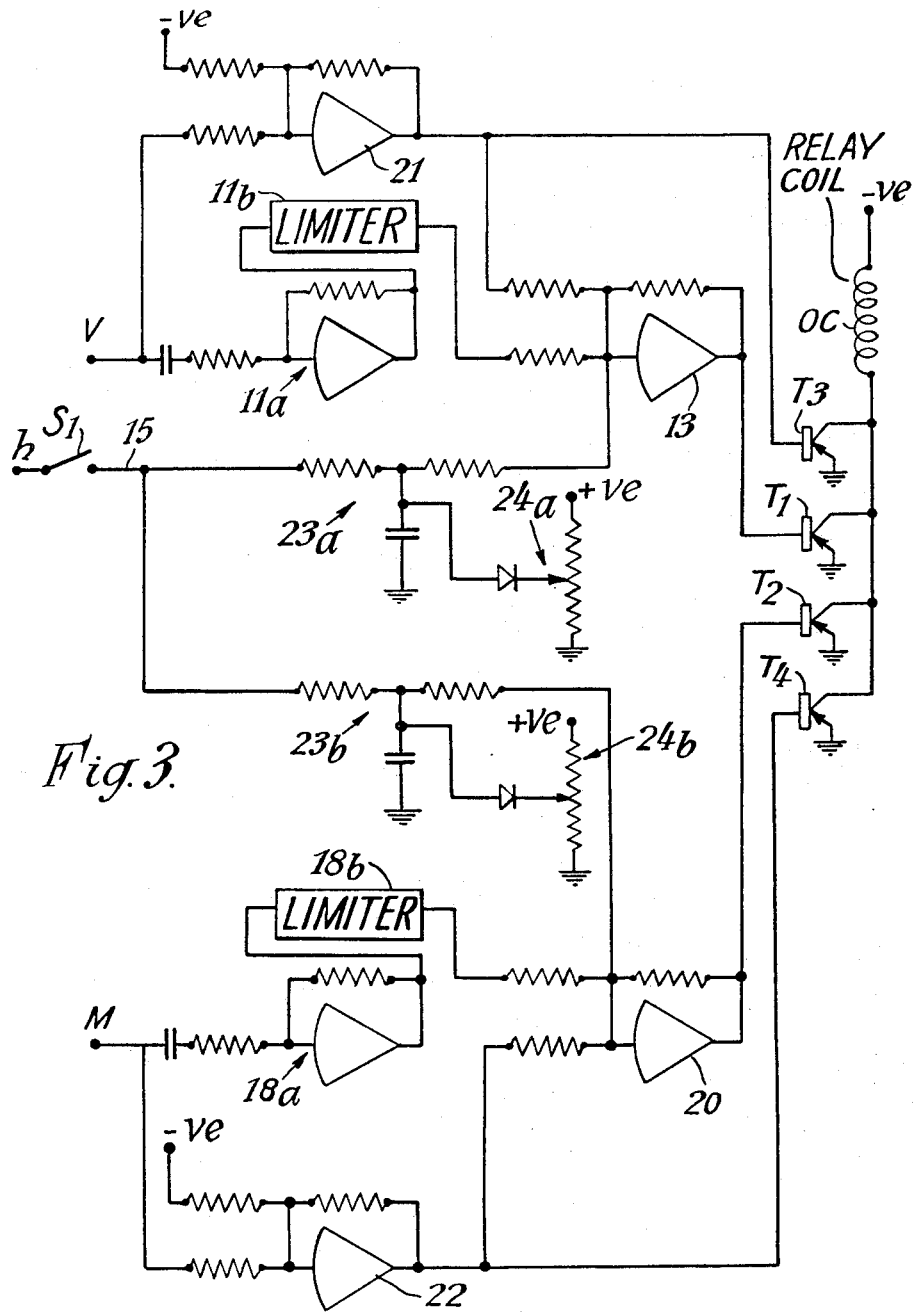

3,411,132
WARNING APPARATUS FOR AIRCRAFT
Eric Priestley, Lewisham, London, England, assignor to Elliott Brothers (London) Limited, London, England, a British Company
Filed Feb. 7, 1966, Ser. No. 525,752
Claims priority, application Great Britain, Feb. 17, 1965, 6,822/65
11 Claims. (Cl. 340—27)

ABSTRACT OF THE DISCLOSURE

A warning signal, to indicate that an aircraft is in an upset condition, is provided by two basic signals. One signal represents the difference between a predetermined maximum speed and the actual speed of the aircraft and is operable, when the latter exceeds the former, to actuate the warning signal. The second signal is derived by comparing the first signal with a signal representing the actual rate at which the aircraft speed is changing, and when the latter exceeds the former, the warning is energized. In this way, the warning allows the pilot additional time to take recovery action from the upset condition.

---

The invention relates to warning apparatus for use in aircraft to provide a sufficiently early warning when a so-called "upset" condition of the aircraft is obtaining.

An aircraft is considered to be in an "upset" condition when its flight path is diverging, particularly downwards, from that desired, with a corresponding divergent increase of speed. The rates of divergence are usually initially small but increase continuously with time. This condition can be encountered, for example, when a pilot unknowingly allows the aircraft to enter a steepening dive due to the autopilot becoming disengaged.

According to one aspect of the invention apparatus, capable of causing actuation of warning means in an aircraft for indicating that the aircraft is in an upset condition, includes means arranged to be responsive to a measure of the speed of the aircraft and to at least one other flight condition of the aircraft so as to provide an output, for causing actuation of the warning means, when the aircraft exceeds a speed which is less than a predetermined speed by an amount determined by the other flight condition or conditions.

The output from the apparatus may be caused to occur under control of either one or both of two separate arrangements, one arrangement being responsive to indicated airspeed and the other flight condition or conditions, and the other arrangement being responsive to Mach number and the other flight condition or conditions.

The other flight condition or conditions may be the rate of change of airspeed and/or Mach number of the aircraft, the vertical speed of the aircraft or a combination of both such conditions.

According to a further aspect of the invention apparatus, capable of causing actuation of warning means in an aircraft for indicating that the aircraft is in an upset condition, includes first means capable of producing an output signal representative of a predetermined speed, second means capable of producing a signal representative of actual speed of the aircraft plus a further speed which is a function of the rate of increase of speed of the aircraft and comparator means arranged to be fed with the outputs from the first and second means, the whole arrangement being such that when the output from the second means exceeds the output from the first means an output is produced from the comparator means which is capable of actuating the warning means.

According to a further aspect of the invention apparatus, capable of causing actuation of warning means in an aircraft for indicating that the aircraft is in an upset condition, includes first means capable of producing an output signal representative of a predetermined speed which is fed to first comparator means where it is compared with a signal representative of the actual speed of the aircraft, the output of the comparator means which is representative of the difference between the inputs thereto being fed so as to cause actuation of the warning means when the input thereto representative of actual speed exceeds the input thereto from said first means and being fed to second comparator means where it is compared with a signal representative of actual rate of change of speed of the aircraft, the output of the second comparator means being fed so as to cause actuation of the warning means when the input thereto representative of actual rate of change of speed exceeds the input thereto from said first comparator.

The foregoing and further features of the invention will become apparent from the following description of some specific embodiments thereof with reference to the accompanying drawings, in which:

FIGURE 1 is a block schematic representation of a simplified system for use in an aircraft for providing a warning when the aircraft is in an upset condition;

FIGURE 2 is a block schematic representation of the system of FIGURE 1 in greater detail, and FIGURE 3 is a circuit diagram of the system of FIGURE 2.

Referring now to FIGURE 1 there is shown a block schematic representation of a system for providing an early warning that an aircraft is in an upset condition, the system taking into account rate of change of airspeed, Mach number and vertical speed of the aircraft as well as airspeed and Mach number. Two separate arrangements are provided, one being responsive to indicated airspeed and the other being responsive to Mach number.

The arrangement comprises a phase advance unit 11 which is arranged to be fed with an input representative of indicated airspeed from an air data system 12. A suitable air data system is disclosed in our United States patent specification No. 3,126,736. The phase advance unit 11 produces an output which is representative of the airspeed plus a further speed which is the product of the rate of increase of airspeed and a time-constant built in the unit 11. The output of the unit 11 is fed as an input to a summation amplifier 13.

A further input for summation amplifier 13 is derived from a unit 14 which is arranged to provide an output representative of a predetermined airspeed, this predetermined airspeed being the airspeed which should not be exceeded by the aircraft when flying at constant height and speed.

A further input to the summation amplifier 13 representative of vertical speed is derived via lead 15 via a switch S1 from the air data system 12, the corresponding output from amplifier 13 being equivalent to a predetermined value of airspeed per unit vertical speed. The switch S1 is provided so that if the pilot or an automatic pilot decides that the aircraft should descend the signal representative of vertical speed can be inhibited from summation amplifier 13, thus preventing the occurrence of nuisance warnings. The switch S1 could be arranged to be opened by the operation of the aircraft drive brakes which would be actuated when the aircraft is positively caused to descend. The output from summation amplifier 13 is fed to a relay 16 which when energised causes actuation of a warning unit 17 which may, for example, be in the form of a bell.

The arrangement is such that an output of changed polarity is provided from summation amplifier 13 to energise relay 16 when the input to summation amplifier 13 from unit 14 (of say negative polarity) is exceeded by the input from unit 11 and on lead 15 (of say positive polarity). Hence if the aircraft is flying at a constant speed and constant height the relay 16 will be energised if the airspeed exceeds the predetermined airspeed set into unit 14. If the airspeed is increasing then the relay 16 will be energised before the airspeed reaches the airspeed set into unit 14. If the aircraft is also descending, other than due to positive control, the relay 16 will be energised at an even lower airspeed than the airspeed set into unit 14.

A simple numerical example of the above is that with the airspeed 300 knots set into unit 14 and if the aircraft is flying at constant airspeed and height the relay 16 will be energised if the airspeed exceeds 300 knots. However if the aircraft is accelerating at a rate of 1 knot per second at constant height and the time constant built into unit 11 is 10 seconds the relay 16 will be energised when the airspeed of the aircraft reaches 300 minus 10 equals 290 knots. If the airspeed is increasing at 1 knot per second in a descent of 3,000 feet per minute then relay 16 will be energised at 300 minus 10 minus 6 equals 284 sponding to unit 14 and a summation amplifier 20 corresponding to the signal in lead 15 is equivalent to a speed of 1 knot per 500 feet per minute descent rate.

The portion of the system so far described is the portion related to indicated airspeed. A similar arrangement of identical operation is provided which is responsive to Mach number, this arrangement comprising phase advance unit 18 corresponding to unit 11, a unit 19 corresponding to unit 14 and a summation amplifier 20 corresponding to amplifier 13. Furthermore relay 16 will be energised when either the output from amplifier 13 or that from amplifier 20 changes sign in the sense previously described.

Referring now to FIGURE 2 there is shown a block schematic representation of a system similar to that of FIGURE 1 shown in more detail and slightly modified. In this arrangement the units 11 and 18 produce an output representative of the rate of change of speed and comprise shaper units 11a and 18a respectively arranged to differentiate and smooth the inputs thereto and limiters 11b and 18b respectively. Smoothing and limiting are provided to ensure that the speed at which the warning indication is given is not reduced by an extensive amount such as would cause nuisance warnings due to airspeed fluctuations when flying in severe turbulance.

The units 14 and 19 are arranged to supply their outputs to respective additional summation amplifiers 21 and 22 which also derive respective inputs from the air data system 12 representative of indicated airspeed and Mach number. Summation amplifier 21 is arranged to provide an output representative of the actual indicated airspeed minus the predetermined airspeed set into unit 14 and summation amplifier 22 is arranged to provide an output representative of Mach number minus the Mach number set into unit 19. The amplifiers 21 and 22 are connected to provide outputs which are fed to summation amplifiers 13 and 20 respectively, the outputs from summation amplifiers 21 and 22 being also fed to control actuation of the warning unit 17 such actuation only occurring when these outputs are positive.

The signal representative of vertical speed on lead 15 is fed via switch S1, a shaping unit 23 which provides smoothing and a limiter 24 to the summation amplifiers 13 and 20. The limiter 24 is provided so that the warning unit 17 is not actuated at too low an airspeed or Mach number when the aircraft is descending rapidly at the pilot's will.

Referring now to FIGURE 3 there is shown a circuit diagram for the arrangement of FIGURE 2. This figure shows the addition of four switching transistors T1, T2, T3 and T4 connected respectively, on the one hand, between the outputs of summation amplifiers 13, 20, 21 and 22 and on the other hand, an operating coil OC of a relay or a bell for providing the warning indication.

It should be noted that with the system as illustrated in FIGURES 2 and 3 the warning unit would be operated as a result of the actual indicated airspeed exceeding the predetermined speed or the actual Mach number exceeding the predetermined Mach number, if not already operated.

The arrangements shown herein effectively act to reduce the predetermined speed at which an upset condition is signalled when the aircraft is accelerating and/or descending so allowing the pilot aditional time to take recovery action from the upset condition.

I claim:

1. Apparatus capable of causing actuation of warning means in an aircraft for indicating that the aircraft is in an upset condition, including first means capable of producing an output signal representative of a predetermined speed which is fed to first comparator means where it is compared with a signal representative of the actual speed of the aircraft, the output of the comparator means which is representative of the difference between the inputs thereto being fed so as to cause actuation of the warning means when the input thereto representative of actual speed exceeds the input thereto from said first means and being fed to second comparator means where it is compared with a signal representative of actual rate of change of speed of the aircraft, the output of the second comparator means being fed so as to cause actuation of the warning means when the input thereto representative of actual rate of change of speed exceeds the input thereto from said first comparator.

2. Apparatus as claimed in claim 1 wherein said first comparator means and said second comparator means each comprise a summation amplifier, the whole arrangement being such that the inputs thereto are of opposite polarities, the output from either summation amplifier of a predetermined polarity being arranged to cause actuation of the warning means.

3. Apparatus as claimed in claim 2 wherein the signal representative of actual rate of change of speed of the aircraft is derived from the signal representative of actual speed of the aircraft by means comprising shaping means and limiting means connected in series.

4. Apparatus as claimed in claim 1 wherein a signal representative of the actual vertical speed of the aircraft is also fed to said second comparator means, this signal being arranged to act additively with the signal representative of actual rate of change of speed.

5. Apparatus as claimed in claim 2 wherein a signal representative of the actual vertical speed of the aircraft is also fed to said second comparator means, this signal being arranged to act additively with the signal representative of actual rate of change of speed.

6. Apparatus as claimed in claim 4 wherein means is provided for preventing the signal representative of the actual vertical speed of the aircraft from reaching said second comparator means when the aircraft is positively caused to descend.

7. Apparatus as claimed in claim 5 wherein means is provided for preventing the signal representative of the actual vertical speed of the aircraft from reaching said second comparator means when the aircraft is positively caused to descend.

8. Apparatus capable of causing actuation of warning means in an aircraft for indicating that the aircraft is in an upset condition including two sets of apparatus as claimed in claim 1, one set of apparatus being arranged to utilize signals representative of airspeed and the other set of apparatus being arranged to utilize signals representative of Mach number.

9. Apparatus capable of causing actuation of warning means in an aircraft for indicating that the aircraft is in an upset condition including two sets of apparatus as claimed in claim 2, one set of apparatus being arranged to utilize signals representative of airspeed and the other set of apparatus being arranged to utilize signals representative of Mach number.

10. Apparatus as claimed in claim 8 wherein a signal representative of the actual vertical speed of the aircraft is also fed to said comparator means, this signal being arranged to act additively with the output signal from said second means, means being provided for preventing the signal representative of the actual vertical speed of the aircraft from reaching the comparator means when the aircraft is positively caused to descend.

11. Apparatus as claimed in claim 9 wherein a signal representative of the actual vertical speed of the aircraft is also fed to said comparator means, this signal being arranged to act additively with the output signal from said second means, means being provided for preventing the signal representative of the actual vertical speed of the aircraft from reaching the comparator means when the aircraft is positively caused to descend.

References Cited

UNITED STATES PATENTS

| 3,077,575 | 2/1963 | Beck et al. | 340—27 |
| 3,080,546 | 3/1963 | Deschamps et al. | 340—27 |
| 3,132,323 | 5/1964 | Hauptman | 340—27 |
| 3,302,167 | 1/1967 | Andresen | 340—27 |

JOHN W. CALDWELL, *Primary Examiner.*

ALVIN H. WARING, *Assistant Examiner.*